Feb. 26, 1957  M. R. OSBORN  2,783,360
WELDING TORCH
Filed June 28, 1954
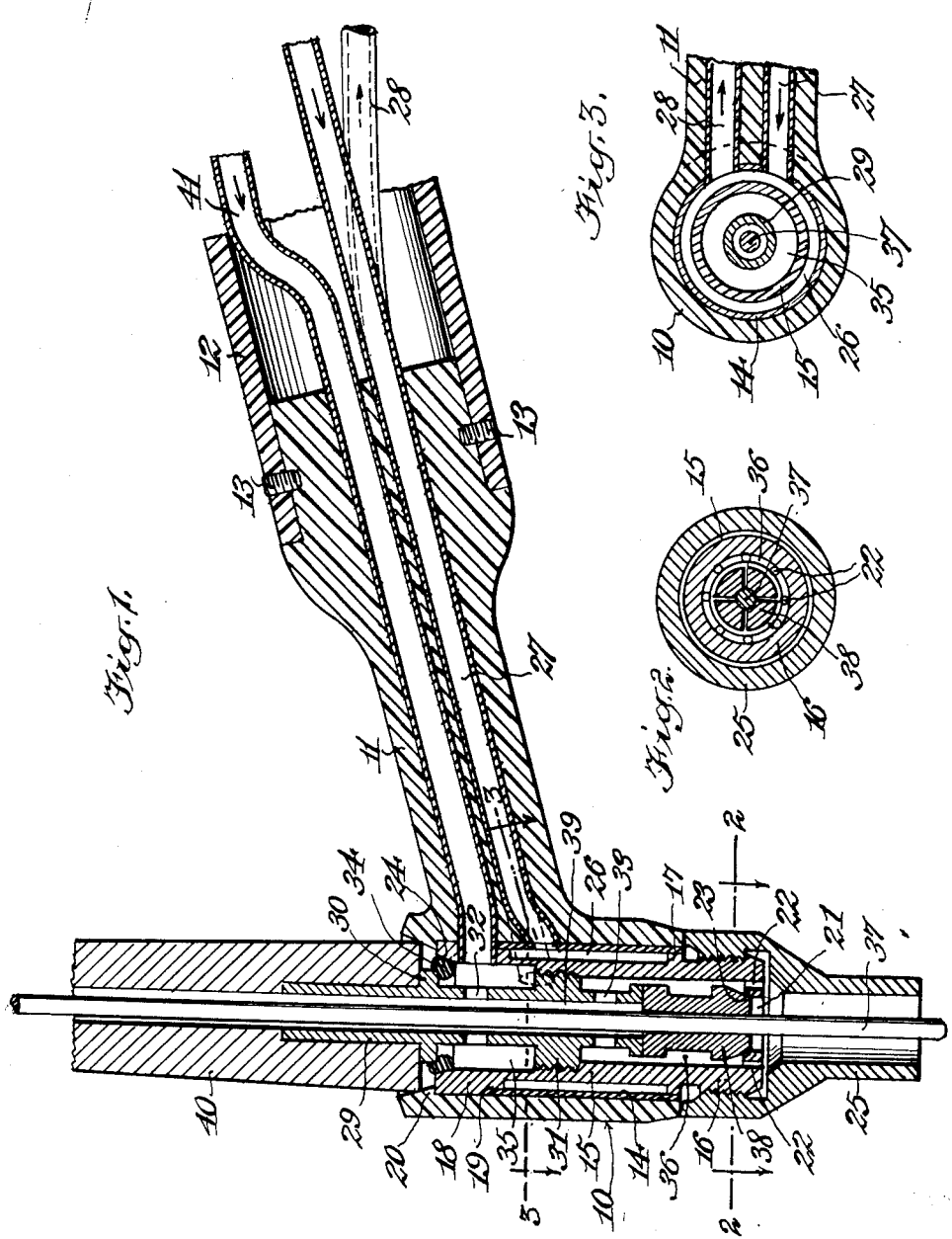
INVENTOR
*Max R. Osborn*
BY
*Munn, Liddy, Nathanson & March*
ATTORNEYS

2,783,360

WELDING TORCH

Max R. Osborn, New York, N. Y.

Application June 28, 1954, Serial No. 439,649

8 Claims. (Cl. 219—75)

This invention relates to a water-cooled welding torch of the inert gas-blanketed tungsten-arc welding type.

Torches of the indicated type hitherto provided have been found to be unsatisfactory because of water leaks, high gas consumption due to poor cooling characteristics, high frequency current leaks due to poor insulation, and their unwieldly and costly construction.

The principal object of the present invention is to eliminate the above mentioned disadvantages and faults by providing a welding torch of the indicated character which is safe, easy to handle and durable for the most exacting working conditions; and one which is of substantial and efficient design so as to be manufactured at comparatively low cost.

With the foregoing, other objects and advantages of this invention will appear as the following description is read in conjunction with the accompanying drawing, in which:

Fig. 1 is a central longitudinal sectional view of a torch embodying the features of the present invention, portions thereof being broken off;

Fig. 2 is a sectional view taken on the line 2—2 of Fig. 1 looking in the direction indicated by the arrows thereof; and Fig. 3 is a sectional view taken on the line 3—3 of Fig. 1 looking in the direction indicated by the arrows thereof.

The torch of the present invention has a barrel or hollow cylindrical body 10 with a hollow handle portion 11 integral therewith and extending laterally therefrom. The body 10 is made of suitable dielectric and heat resistant material. A hollow handle 12 is secured to the portion 11 by set screws 13, said handle being made of insulating material.

In order to provide a water jacket within the body 10, use is made of an outer cylindrical tubular member 14 and an inner tubular member 15. The member 14 is made of metal and fits snugly within the body 10 and is long enough to extend from the lower end edge of the body 10 to a point short of the upper end edge of the body. The member 15 of brass has an enlarged screw portion 16 at the lower end, a circular abutment 17 near the portion 16, a rabbeted portion 18 at the upper end providing a shoulder 19. The member 14 is secured by soldering or the like to the base of the shoulder 19 and the circular abutment 17. The portion 18 snugly fits in the body 10 and bears against a circular shoulder 20 on the body while the upper end of the member 14 contacts the shoulder 19 throughout. Also the member 15 has a central opening 21 at the lower end and a series of holes 22 around the opening 21, a seat 23 surrounding the opening 21, and a seat 24 on the upper end of the member 15.

A replaceable or expendable nozzle 25 is in threaded engagement with the portion 16. The members 14 and 15 in place within the body 10 form a cylindrical water space 26. Water under pressure flows into the space 26 through a copper tube 27 which extends through the handle 12 and the portion 11 with the inner end of the tube soldered into a hole in the member 14. Water flows out of the space 26 through a copper tube 28 soldered into a notched hole in the member 14, said tube 28 extending through the portion 11 and the handle 12, and is connected to a flexible hose leading to a drain for the return water.

Arranged to extend coaxially of the member 15 is a tubular clamping or thrust member or sleeve 29. This sleeve has an intermediate circular shoulder or abutment 30, an enlarged male screw portion 31 below and spaced from the abutment 30, radial ports 32 between the abutment 30 and the portion 31, and radial ports 33 below the portion 31. The portion 31 is adapted for threaded engagement with the member 15, the latter being tapped for that purpose. Thus the sleeve 29 is axially movable with respect to the body 10 and the member 15 by turning movement of the sleeve clockwise or counterclockwise. A gasket 34 is interposed between the seat 24 and the abutment 30 making an airtight joint at the upper end of the member 15 which together with the sleeve 29 form an annular chamber 35. The ports 32 communicate with the chamber 35, and the ports 33 communicate with the hollow 36 of the lower end portion of the member 15.

A tungsten electrode 37 disposed coaxially of the sleeve 29 is adjustably and removably secured in a functioning position by means of a collet 38 interposed between the seat 23 and the lower end face of the sleeve 29. The thrust of the sleeve 29 by turning the latter clockwise causes the collet 38 in engagement with seat 23 to releasably grip the electrode 37 with the lower end portion of the electrode projecting downwardly through the nozzle 25. By turning the sleeve 29 slightly counterclockwise the sleeve will move axially upward thereby opening the collet 38 and so enabling the axial adjustment and/or the replacement of the electrode 37. The diameter of the lower portion of the sleeve 29 and the diameter of the collet 38 are smaller than the diameter of the hollow 36. The diameter of the electrode is smaller than the internal diameter of the sleeve 29 thereby providing an annular passage 39 in communication with the ports 32 and 33. A tail piece 40 of insulating material is secured to the upper end portion of the sleeve 29 for turning the latter, said tail piece being hermetically sealed to the sleeve. The upper end portion (not shown) of the tail piece 40 may be closed beyond the end of the electrode 37 by any suitable means, to prevent escape of gas, as may be readily understood. Thus there is provided a continuous flow passageway from the chamber 35 to the nozzle 25 by way of the ports 32, passage 39, ports 33, hollow 36, and holes 22 in the order named for the flow of an inert gas. This kind of gas is delievered to the chamber 35 by a copper tube 41 extending through the handle 12 and the portion 11 into a hole in the member 15 to which the tube is soldered.

Electrical connection is made to the copper tube 28, the tube 28 being electrically connected with the member 15 which conducts the electric current to the electrode 37 through the sleeve 29 and collet 38. The cable and hose are not shown.

The heat originates from the tip of the electrode 37 and is conducted by the latter to the collet 38 and the sleeve 29 and from the latter to the water jacket member 15. These parts being in the most intimate union possible afford a heat exchange means of effectual and efficient character. The flow of the gas through the aforesaid passageway along the tungsten electrode augments the cooling effect and by virtue of the holes 22 a complete and even distribution of the gas around the electrode and the molten pool of the metal to be welded is assured. The water circulating through the large water jacket formed by the members 14 and 15 is brought as close as possible to the area most effected by the heat generated at the tip of the electrode, thus keeping the torch cool in its entirety.

From the foregoing it will be evident that the objects of the invention mentioned hereinabove are attained in a simple and practicable manner.

I claim:

1. In a welding torch, a body of dielectric and heat resistant material, an electrode holder extending into said body, said holder including a tubular electrical conducting member having internal screw threads; a tubular sleeve member fitting in said body and surrounding said conducting member and having its opposite ends respectively in contact with said conducting member, said conducting member and sleeve member forming a jacket within said body through which a cooling medium may flow; conduit means extending through said body and sleeve member for circulating the cooling medium through said jacket; a collet in said conducting member, for engaging the electrode; and means engaging said collet and screw threads, for actuating the collet to clamp or release the electrode.

2. In a welding torch, a body of dielectric and heat resistant material, an electrode holder extending into said body, said holder including a tubular electrical conducting member having internal screw threads; a tubular sleeve member fitting in said body and surrounding said conducting member and having its opposite ends respectively in contact with said conducting member, said conducting member and sleeve member forming a jacket within said body through which a cooling medium may flow; and conduit means extending through said body and sleeve member for circulating the cooling medium through said jacket; a collet in said conducting member for engaging the electrode; and means engaging said collet and screw threads for actuating the collet to clamp or release the electrode, said means for actuating the collet including a second tubular electrical conducting member extending coaxially into and in threaded engagement with the first mentioned conducting member enabling axial movement of the second conducting member with respect to the first mentioned conducting member into different positions of adjustment, said second conducting member having axially spaced radial ports therein, a gasket, cooperative means on the conducting members engaging said gasket and closing one end of the first mentioned conducting member and forming a continuous passageway extending between the conducting members at axially spaced intervals and also inside of the second conducting member and opening through the other end of the first mentioned conducting member enabling a gas to flow along surfaces of the conducting members and along surfaces of an electrode secured in said holder.

3. In a welding torch, a body of dielectric and heat resistant material, an electrode holder extending into said body, said holder including cooperative inner and outer tubular electrical conducting members in threaded engagement with each other whereby said inner conducting member is turnable and axially movable with respect to the outer conducting member, said inner conducting member having axially spaced radial ports therein, a gasket, and cooperative means on the conducting members engaging said gasket and closing one end of the outer conducting member and together with the conducting members forming a continuous passageway extending between the conducting members at axially spaced intervals and also inside of the inner conducting member and opening through the other end of the outer conducting member, said passageway enabling a gas to flow along surfaces of the conducting members and along the surface of an electrode secured in said holder.

4. In a welding torch as set forth in claim 3, wherein said outer conducting member has discharge holes therein for distributing the flowing gas about the welding end of the electrode.

5. In a welding torch as set forth in claim 4, wherein said outer conducting member also has an opening therein through which the welding end of the electrode may project.

6. In a welding torch as set forth in claim 1, and a nozzle in threaded engagement with said conducting member.

7. In a welding torch, electrode holding means forming a passageway through the torch for a flowing gas, said holding means including a tubular member having a series of discharge holes for distributing the gas about the welding end of an electrode held by said holding means, and a second member which is tubular and axially adjustable in the first tubular member by reason of threaded engagement therewith and has radial axially spaced ports therein for diverting the gas into and out of said second member.

8. In a welding torch as set forth in claim 7, wherein said holding means includes a collet with which said members cooperate for the purpose of gripping and releasing an electrode.

References Cited in the file of this patent

UNITED STATES PATENTS

| | | |
|---|---|---|
| 2,547,872 | Kissick | Apr. 3, 1951 |
| 2,554,236 | Bernard | May 22, 1951 |
| 2,659,797 | Anderson | Nov. 17, 1953 |
| 2,685,632 | Behnke | Aug. 3, 1954 |